United States Patent
Jung et al.

(10) Patent No.: US 12,482,603 B2
(45) Date of Patent: Nov. 25, 2025

(54) MULTILAYER ELECTRONIC COMPONENT AND METHOD OF MANUFACTURING MULTILAYER ELECTRONIC COMPONENT

(71) Applicant: SAMSUNG ELECTRO-MECHANICS CO., LTD., Suwon-si (KR)

(72) Inventors: Hoe Chul Jung, Suwon-si (KR); Yun Sung Kang, Suwon-si (KR); Sun Hwa Kim, Suwon-si (KR); Byeong Gyu Park, Suwon-si (KR); Won Jun Na, Suwon-si (KR); Doo Young Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 130 days.

(21) Appl. No.: 18/377,892

(22) Filed: Oct. 9, 2023

(65) Prior Publication Data
US 2024/0186067 A1    Jun. 6, 2024

(30) Foreign Application Priority Data

Dec. 6, 2022  (KR) .................. 10-2022-0168608

(51) Int. Cl.
*H01G 4/12* (2006.01)
*H01G 4/012* (2006.01)
*H01G 4/30* (2006.01)

(52) U.S. Cl.
CPC .......... *H01G 4/1227* (2013.01); *H01G 4/012* (2013.01); *H01G 4/306* (2013.01)

(58) Field of Classification Search
CPC ...... H01G 4/1227; H01G 4/012; H01G 4/306; H01G 4/0085; H01G 4/1209; H01G 4/30; H01G 4/005; H01G 4/12
See application file for complete search history.

(56) References Cited

U.S. PATENT DOCUMENTS

| | | | |
|---|---|---|---|
| 11,450,484 B2* | 9/2022 | Wakashima | H01G 4/30 |
| 11,551,875 B2* | 1/2023 | Kang | H01G 4/232 |
| 11,894,193 B2* | 2/2024 | Kim | H01G 4/1227 |
| 2006/0214263 A1* | 9/2006 | Kojima | H01G 4/30 257/532 |

(Continued)

FOREIGN PATENT DOCUMENTS

| | | | | |
|---|---|---|---|---|
| JP | 2004-319969 A | | 11/2004 | |
| JP | 2006278566 A | * | 10/2006 | H01G 4/012 |

(Continued)

OTHER PUBLICATIONS

WO '094 Translation (Year: 2018).*

*Primary Examiner* — Dion R. Ferguson
(74) *Attorney, Agent, or Firm* — Morgan, Lewis & Bockius LLP

(57) ABSTRACT

A multilayer electronic component includes a body including a dielectric layer and an internal electrode alternately disposed with the dielectric layer, and an external electrode disposed on the body. A ceramic layer is disposed between the dielectric layer and the internal electrode. When an area ratio occupied by pores with respect to the ceramic layer is Sp1 and an area ratio occupied by pores with respect to the dielectric layer is Sp2, Sp1 is less than 5%, and Sp1<Sp2 is satisfied.

20 Claims, 7 Drawing Sheets

(56) References Cited

U.S. PATENT DOCUMENTS

| | | | | |
|---|---|---|---|---|
| 2008/0304204 A1* | 12/2008 | Suzuki | ............... | H01G 4/30 |
| | | | | 361/321.3 |
| 2012/0147514 A1* | 6/2012 | Suh | ............... | H01G 4/30 |
| | | | | 156/89.12 |
| 2014/0175942 A1 | 6/2014 | Banno et al. | | |
| 2016/0027587 A1* | 1/2016 | Furukawa | ............... | C23C 18/1225 |
| | | | | 428/697 |
| 2016/0196918 A1* | 7/2016 | Hong | ............... | H01G 4/232 |
| | | | | 361/301.4 |
| 2018/0301282 A1* | 10/2018 | Nishikawa | ............... | C04B 35/62272 |
| 2019/0348222 A1* | 11/2019 | Kato | ............... | H01G 4/1227 |
| 2020/0411248 A1* | 12/2020 | Hashimoto | ............... | H01G 4/1227 |
| 2021/0202181 A1* | 7/2021 | Wakashima | ............... | H01G 4/30 |
| 2022/0076891 A1* | 3/2022 | Han | ............... | H01G 4/1227 |
| 2022/0216008 A1* | 7/2022 | Kim | ............... | H01G 4/30 |
| 2023/0128407 A1* | 4/2023 | Masuda | ............... | H01G 4/30 |
| | | | | 361/301.4 |
| 2023/0290577 A1* | 9/2023 | Tsushima | ............... | H01G 4/1218 |
| 2023/0298819 A1* | 9/2023 | Tsushima | ............... | H01G 4/1227 |
| | | | | 361/301.4 |
| 2024/0186067 A1* | 6/2024 | Jung | ............... | H01G 4/30 |

FOREIGN PATENT DOCUMENTS

| | | | | |
|---|---|---|---|---|
| JP | 5641139 B2 | 12/2014 | | |
| WO | WO-2018038094 A1 * | 3/2018 | ............... | H01G 4/12 |
| WO | WO-2021080085 A1 * | 4/2021 | ............... | H01G 4/008 |

\* cited by examiner

MULTILAYER ELECTRONIC COMPONENT AND METHOD OF MANUFACTURING MULTILAYER ELECTRONIC COMPONENT

CROSS-REFERENCE TO RELATED APPLICATION (S)

This application claims benefit of priority to Korean Patent Application No. 10-2022-0168608 filed on Dec. 6, 2022 in the Korean Intellectual Property Office, the disclosure of which is incorporated herein by reference in its entirety.

TECHNICAL FIELD

The present disclosure relates to a multilayer electronic component and a method of manufacturing the same.

A multilayer ceramic capacitor (MLCC), a multilayer electronic component, may be a chip-type condenser mounted on a printed circuit board of various types of electronic products, such as an imaging device including a liquid crystal display (LCD) or a plasma display panel (PDP), a computer, a smartphone or a mobile phone, to serve to charge or discharge electricity therein or therefrom.

Such an MLCC, having a small size and high capacitance, may be easily mounted on a circuit board, and thus may be used as a component of various electronic devices, such that there has been increasing demand for an MLCC to have a smaller size and higher capacitance as each of various electronic devices, such as a computer and a mobile device, has a smaller size and higher capacitance. As MLCCs have a smaller size and higher capacitance, it becomes increasingly important for MLCCs to have increased capacitance per unit volume.

An MLCC may basically include a body in which a dielectric layer and an internal electrode are stacked, and an external electrode disposed on the outside of the body. During a sintering process, a difference in shrinkage rates between the dielectric layer and the internal electrode may occur. Due to such a difference in shrinkage rates, stress non-uniformity may occur between the dielectric layer and the internal electrode, and disconnection between internal electrodes and agglomeration of the internal electrodes may occur, thereby increasing a thickness of the internal electrode and reducing a thickness of the dielectric layer. Accordingly, the MLCC may have reduced capacitance, and may have degraded withstand voltage and insulation resistance characteristics. Accordingly, there is need for the development of a MLCC having improved stress non-uniformity between a dielectric layer and an internal electrode.

SUMMARY

An aspect of the present disclosure is to provide a multilayer electronic component having excellent reliability.

Another aspect of the present disclosure is to provide a multilayer electronic component having improved capacitance per unit volume.

Another aspect of the present disclosure is to improve stress non-uniformity between a dielectric layer and an internal electrode during a sintering process.

However, the aspects of the present disclosure are not limited to those described above, and would be more easily understood in the course of describing specific example embodiments of the present disclosure.

According to an aspect of the present disclosure, there is provided a multilayer electronic component including a body including a dielectric layer and an internal electrode alternately disposed with the dielectric layer, and an external electrode disposed on the body. A ceramic layer may be disposed between the dielectric layer and the internal electrode. When an area ratio occupied by pores with respect to the ceramic layer is Sp1 and an area ratio occupied by pores with respect to the dielectric layer is Sp2, Sp1 may be less than 5%, and Sp1<Sp2 may be satisfied.

According to an aspect of the present disclosure, there is provided a method of manufacturing a multilayer electronic component, the method including forming a first ceramic film by depositing a ceramic material on a ceramic green sheet, forming an internal electrode pattern on the first ceramic film, and forming a second ceramic film by depositing a ceramic material on the internal electrode pattern, obtaining a stack by stacking the ceramic green sheet, obtaining a body by sintering the stack, and forming an external electrode on the body.

According to example embodiments of the present disclosure, a ceramic layer may be disposed between a dielectric layer and an internal electrode, thereby improving reliability of a multilayer electronic component.

According to example embodiments of the present disclosure, a ceramic layer may be disposed between a dielectric layer and an internal electrode to suppress agglomeration of internal electrodes and disconnection between the internal electrodes, thereby improving capacitance per unit volume of a multilayer electronic component.

The various and beneficial advantages and effects of the present disclosure are not limited to those set forth herein, and will be more easily understood in the course of describing specific example embodiments.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
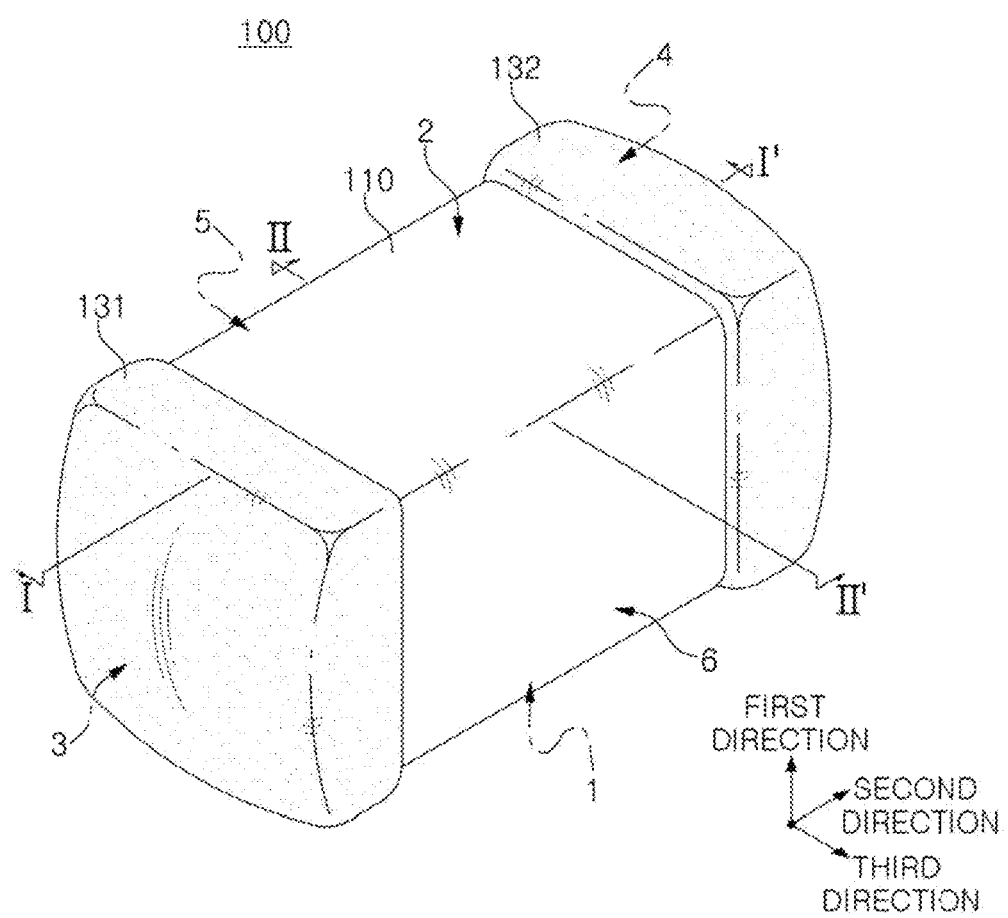
FIG. 1 schematically illustrates a perspective view of a multilayer electronic component according to an example embodiment of the present disclosure.

Hereinafter, example embodiments of the present disclosure are described with reference to the accompanying drawings. The present disclosure may, however, be exemplified in many different forms and should not be construed as being limited to the specific example embodiments set forth herein. In addition, example embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and sizes and thicknesses are magnified in order to clearly represent layers and regions, and similar portions having the same functions within the same scope are denoted by similar reference numerals throughout the specification. Throughout the specification, when an element is referred to as "comprising" or "including," it means that it may include other elements as well, rather than excluding other elements, unless specifically stated otherwise.

In the drawings, a first direction may be defined as a stacking direction or a thickness (T) direction, a second direction may be defined as a length (L) direction, and a third direction may be defined as a width (W) direction.

Multilayer Electronic Component

FIG. 1 schematically illustrates a perspective view of a multilayer electronic component according to an example embodiment of the present disclosure.

Figure 2:
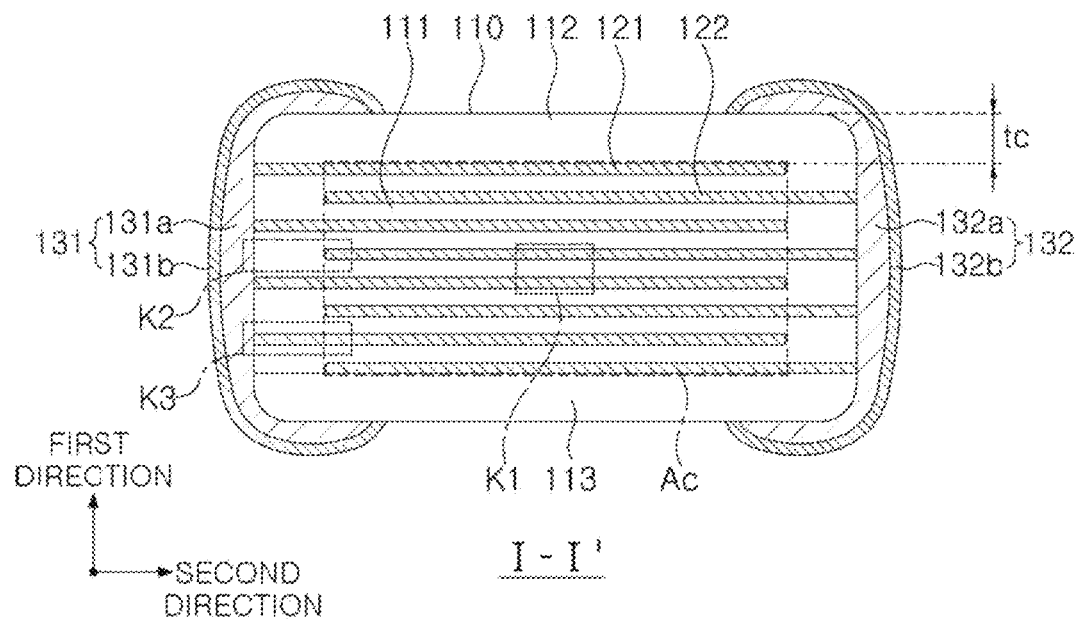
FIG. 2 is a schematic cross-sectional view taken along line I-I' in FIG. 1.

FIG. 2 is a schematic cross-sectional view taken along line I-I' of FIG. 1.

Figure 3:
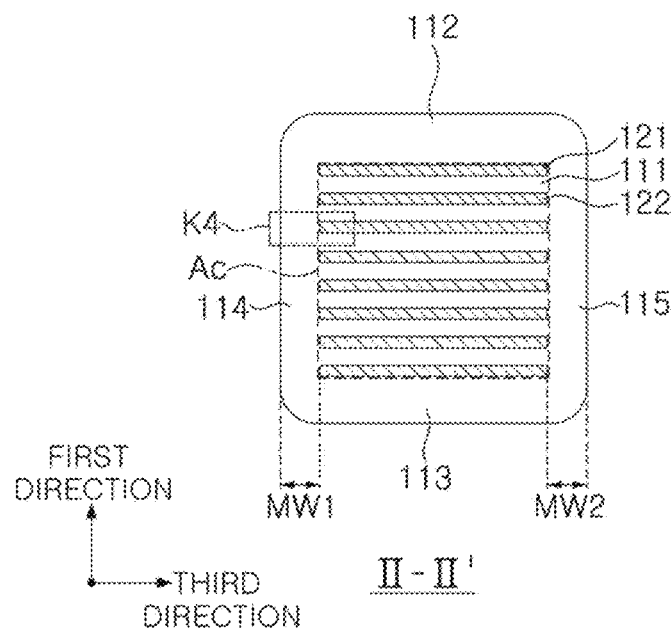
FIG. 3 is a schematic cross-sectional view taken along line II-II' of FIG. 1.

FIG. 3 is a schematic cross-sectional view taken along line II-II' of FIG. 1.

Figure 4:
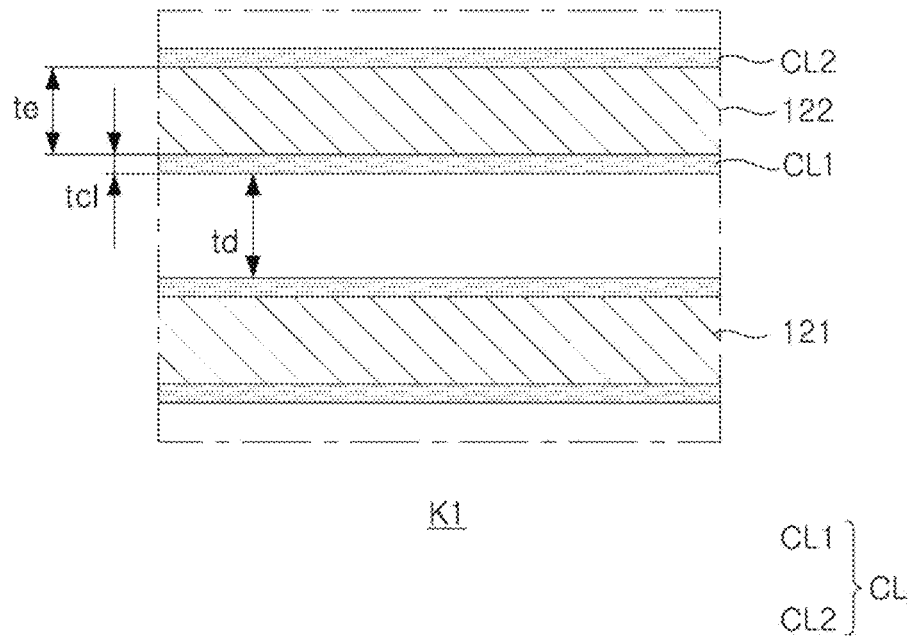
FIG. 4 is an enlarged view of region K1 in FIG. 2.
Figure 5:
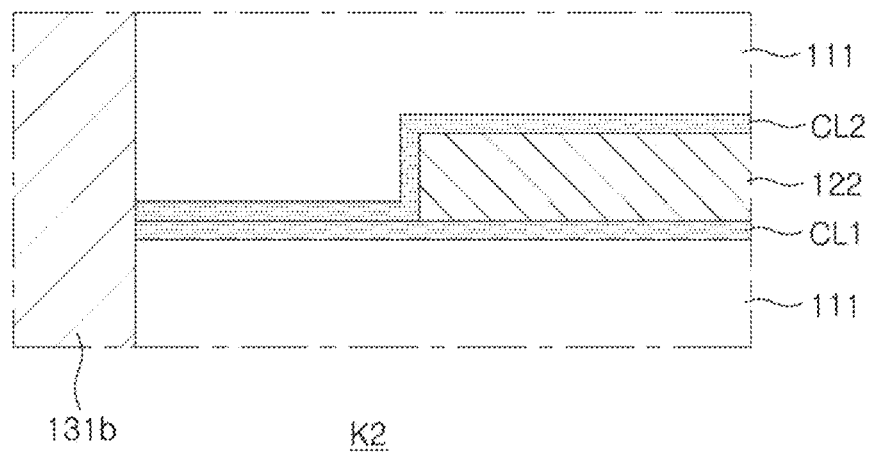
FIG. 5 is an enlarged view of region K2 in FIG. 2.
Figure 6:
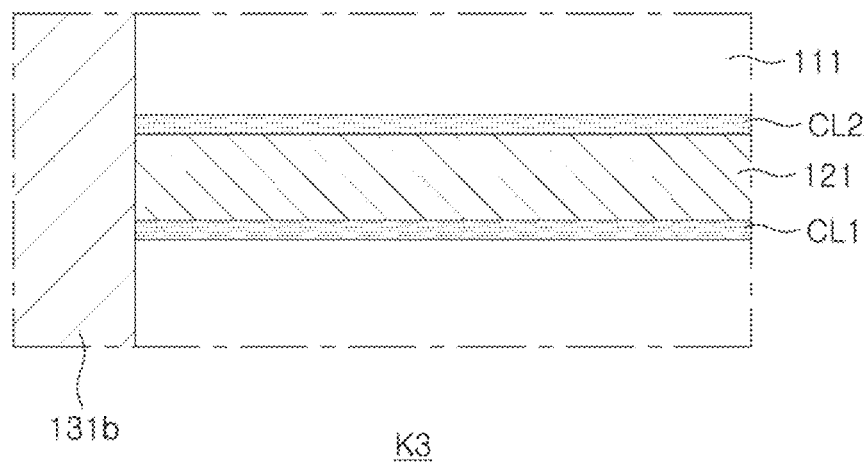
FIG. 6 is an enlarged view of region K3 in FIG. 2.
Figure 7:
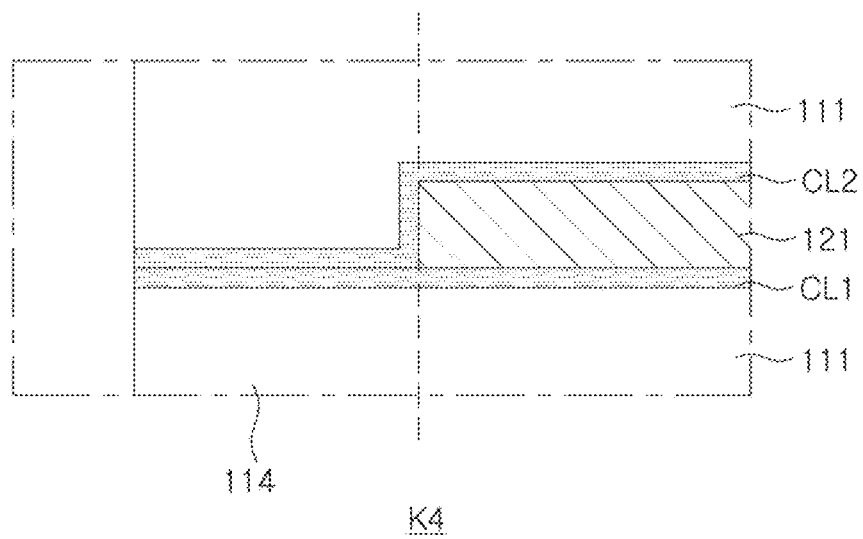
FIG. 7 is an enlarged view of region K4 in FIG. 3.

FIG. 4 is an enlarged view of region K1 of FIG. 2.
FIG. 5 is an enlarged view of region K2 of FIG. 2.
FIG. 6 is an enlarged view of region K3 of FIG. 2.
FIG. 7 is an enlarged view of region K4 of FIG. 3.

Hereinafter, a multilayer electronic component 100 according to an example embodiment of the present disclosure will be described in detail with reference to FIGS. 1 to 7. In addition, a multilayer ceramic capacitor (hereinafter referred to as "MLCC") is described as an example of the multilayer electronic component, but the present disclosure is not limited thereto, and may be applied to various electronic products formed of a ceramic material, such as inductors, piezoelectric elements, varistors, thermistors, or the like.

The multilayer electronic component 100 according to an example embodiment of the present disclosure may include a body 110 including a dielectric layer 111 and an internal electrode 121 or 122 alternately disposed with the dielectric layer, and an external electrode 131 or 132 disposed on the body. A ceramic layer CL may be disposed between the dielectric layer 111 and the internal electrode 121 or 122. When an area ratio occupied by pores with respect to the ceramic layer is Sp1 and an area ratio occupied by pores with respect to the dielectric layer is Sp2, Sp1 may be less than 5%, and Sp1<Sp2 may be satisfied.

According to an example embodiment of the present disclosure, the ceramic layer CL may be disposed between the dielectric layer 111 and the internal electrode 121 or 122 to suppress disconnection between internal electrodes and aggregation of the internal electrodes, thereby improving reliability and capacitance per unit volume of the multilayer electronic component.

In addition, the ceramic layer CL may suppress stress non-uniformity between the internal electrode and the dielectric layer during a sintering process, and may induce a constrained sintering effect to increase a shrinkage rate in a thickness direction, thereby contributing to a reduction in thickness of the internal electrode and an improvement in connectivity of the internal electrode.

When an area ratio occupied by pores with respect to the ceramic layer CL is Sp1 and an area ratio occupied by pores with respect to the dielectric layer 111 is Sp2, Sp1 may be less than 5%, and Sp1<Sp2 may be satisfied.

The area ratio Sp1 occupied by pores with respect to the ceramic layer CL may be less than 5%, such that the ceramic layer CL may have high density and excellent rigidity. Here, the rigidity may refer to a hard property in which a shape or volume does not change even when pressure is applied externally.

The ceramic layer CL, having excellent rigidity, may be disposed between the dielectric layer 111 and the internal electrode 121 or 122, thereby suppressing stress non-uniformity between the internal electrode and the dielectric layer during the sintering process.

In general, during the sintering process, a difference in shrinkage rates between a dielectric layer and an internal electrode may occur. Due to such a difference in shrinkage rates, stress non-uniformity may occur between the dielectric layer and the internal electrode, and disconnection between internal electrodes and agglomeration of the internal electrodes may occur, thereby increasing a thickness of the internal electrode and reducing a thickness of the dielectric layer. Conversely, when the ceramic layer CL having excellent rigidity is disposed between the dielectric layer 111 and the internal electrode 121 or 122 according to an example embodiment of the present disclosure, stress non-uniformity between the internal electrode and the dielectric layer may be suppressed, thereby suppressing disconnection between internal electrodes and agglomeration of the internal electrodes.

Referring to FIG. 4, a first ceramic layer CL1 may be disposed on a lower portion of the internal electrode 121 or 122 in a thickness direction, and a second ceramic layer CL2 may be disposed an upper portion of the internal electrode 121 or 122 in the thickness direction, the internal electrode 121 or 122 may be constrained by the ceramic layer CL1 or CL2, such that shrinkage in a transverse direction (second direction) may be suppressed, resulting in intensive shrinkage in the thickness direction (first direction). Accordingly, connectivity and smoothness of an internal electrode may be improved while a thickness of the internal electrode is reduced.

When the area ratio Sp1 occupied by pores with respect to the ceramic layer CL is 5% or more or is less than or equal to the area ratio Sp2 occupied by pores with respect to the dielectric layer 111, an effect of suppressing stress non-uniformity between the dielectric layer 111 and the internal electrode 121 or 122 and/or a constrained sintering effect may be insufficient.

The area ratio Sp1 occupied by pores with respect to the ceramic layer CL may be measured in cross-sections of the body 110 in first and second directions. Specifically, the area ratio Sp1 may be obtained by measuring an area occupied by pores with respect to arbitrary five ceramic layers CL extracted from an image obtained by scanning, with a scanning electron microscope (SEM), the cross-sections of the body 110 in the first and second directions (length and thickness directions), taken along a central portion of the 110 in a third direction (width direction), and body calculating an average value thereof. In addition, the area ratio Sp2 occupied by pores with respect to the dielectric layer 111 may also be obtained by measuring an area occupied by pores with respect to arbitrary five dielectric layers 111 extracted from the scanned image, and calculating an average value thereof. In addition, the area ratio Sp3 occupied by pores with respect to the internal electrodes may also be obtained by measuring an area occupied by pores with respect to arbitrary five internal electrodes extracted from the scanned image, and calculating an average value thereof. Other methods and/or tools appreciated by one of ordinary skill in the art, even if not described in the present disclosure, may also be used.

The area ratio Sp2 occupied by pores with respect to the dielectric layer 111 is not particularly limited. For example, the area ratio Sp2 occupied by pores with respect to the dielectric layer 111 may be 5% or more and 40% or less, and more preferably 10% or more and 30% or less.

In an example embodiment, the ceramic layer CL may include at least one of Ba, Ti, Si, Zr, Hf, and Sr, thereby further improving an effect of suppressing stress non-uniformity between the dielectric layer 111 of the ceramic layer CL and the internal electrode 121 or 122 and/or a constrained sintering effect.

The ceramic layer CL may not include Ru, Rh, Re, Pt, Ir, and Os. Ru, Rh, Re, Pt, Ir, and Os may move (migrate) from the ceramic layer CL to the dielectric layer 111 under a sintering process condition, thereby reducing capacitance. In addition, the ceramic layer CL may not include $Al_2O_3$. However, the present disclosure is not limited thereto, and the ceramic layer CL may include a predetermined amount of at least one of Ru, Rh, Re, Pt, Ir, Os, and $Al_2O_3$, while maintaining an effect of suppressing stress non-uniformity and a constrained sintering effect of the ceramic layer CL according to the present disclosure.

In an example embodiment, the dielectric layer 111 may include, as a main ingredient, at least one of $BaTiO_3$, $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$, and $Ba(Ti_{1-y}Zr_y)O_3$ $(0<y<1)$, and the ceramic layer CL may include a main ingredient the same as that of the dielectric layer 111. Here, the main ingredient may mean that the number of moles of remaining ingredients, excluding the main ingredient, relative to 100 moles of the main ingredient is 30 moles or less. Accordingly, a decrease in dielectric constant caused by addition of the ceramic layer CL may be minimized. However, compositions of the ceramic layer CL and the dielectric layer 111 may not be completely the same, and the remaining ingredients, excluding the main ingredient, may be different from each other.

In an example embodiment, an average thickness tcl of the ceramic layer CL may be 5 nm or more and 50 nm and less. When the average thickness of the ceramic layer CL is less than 5 nm, the effect of suppressing stress non-uniformity and/or the constrained sintering effect of the ceramic layer CL may be insufficient. When the average thickness of the ceramic layer CL is greater than 50 nm, a dielectric constant may decrease.

Here, a thickness of the ceramic layer CL may refer to a size of the ceramic layer CL in the first direction. The average thickness tcl of the ceramic layer CL may be measured by scanning, with an SEM, cross-sections of the body 110 in the first and second directions at a magnification of 10,000. More specifically, thicknesses of a plurality of points of one ceramic layer CL, for example, at thirty points equally spaced apart from each other in the second direction, may be measured to measure an average value thereof. The thirty equally spaced points may be designated in a capacitance formation portion Ac to be described below. In addition, when such average value measurement is performed on ten ceramic layers CL, the average thickness of the ceramic layer CL may be further generalized.

In an example embodiment, the ceramic layer CL may be formed using a sputtering method, a vacuum deposition method, or an atomic layer deposition (ALD) method. As the ceramic layer CM is formed using the sputtering method, the vacuum deposition method, or the ALD method, the area ratio Sp1 occupied by pores with respect to the ceramic layer CL may be easily controlled to be less than 5%, and the ceramic layer CL may be formed to have a reduced thickness, thereby suppressing a decrease in dielectric constant.

When the internal electrode 121 or 122 is formed using the sputtering method, the vacuum deposition method, or the ALD method, a mask pattern may be necessary. However, the ceramic layer CL may be deposited on an entire surface of a ceramic green sheet. Even after an internal electrode pattern is formed, the ceramic layer CL may be deposited on an entire surface of the internal electrode pattern, and thus a mask pattern may not be necessary. Accordingly, the ceramic layer CL may be easily formed without a mask pattern. In addition, referring to FIG. 5, the first ceramic layer CL1 and the second ceramic layer CL2 may be formed without a mask pattern, such that the first ceramic layer CL1 and the second ceramic layer CL2 may be disposed to be in contact with each other in a longitudinal margin portion, a space in which a second internal electrode 122 and a first external electrode 131 are spaced apart from each other. In addition, the ceramic layer CL may be connected to both third and fourth surfaces.

Referring to FIG. 6, the ceramic layer CL may not be disposed at an end of the first internal electrode 121, such that electrical connectivity with the first external electrode 131 may be secured.

In addition, referring to FIG. 7, the first ceramic layer CL1 and the second ceramic layer CL2 may be formed without a mask pattern, such that the first ceramic layer CL1 and the second ceramic layer CL2 may be disposed to be in contact with each other in a first side margin portion 114, and the first ceramic layer CL1 and the second ceramic layer CL2 may be disposed to be in contact with each other even in a second side margin portion 115. Accordingly, the ceramic layer CL may be connected to all of third, fourth, fifth, and sixth surfaces.

Figure 8:
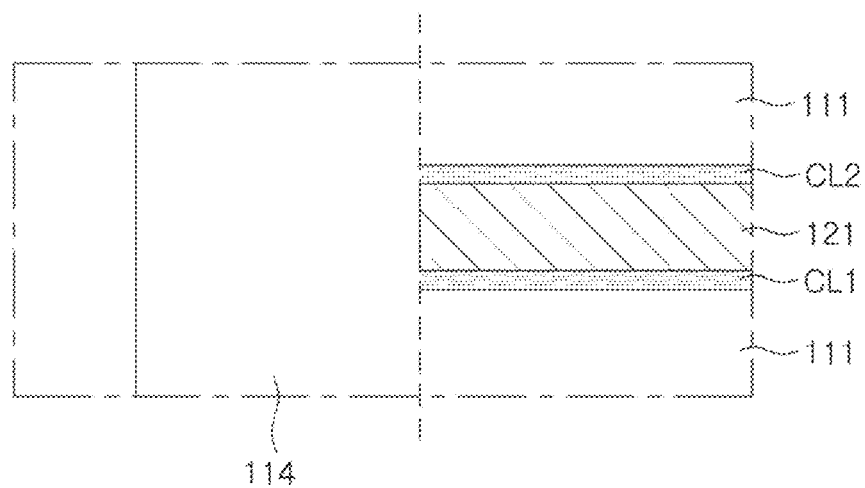
FIG. 8 is a view corresponding to FIG. 7 of a multilayer electronic component according to a modification of an example embodiment of the present disclosure.

However, referring to FIG. 8, in order to suppress a step caused by the internal electrode 121 or 122 according to a modification of the present disclosure, internal electrodes may be stacked on each other and then cut to be exposed to fifth and sixth surfaces 5 and 6 of a body. Thereafter, one dielectric layer or two or more dielectric layers may be stacked on both side surfaces of the capacitance formation portion Ac in the third direction (width direction) to form a side margin portion 114 or 115. In this case, the ceramic layer CL may not be disposed in the side margin portion 114 or 115.

Hereinafter, respective components included in the multilayer electronic component 100 according to an example embodiment of the present disclosure will be described.

In the body 110, the dielectric layer 111 and the internal electrode 121 or 122 may be alternately stacked.

A specific shape of the body 110 is not particularly limited. However, as illustrated, the body 110 may have a hexahedral shape or a shape similar thereto. During a sintering process, ceramic powder particles included in the body 110 may shrink, such that the body 110 may not have a hexahedral shape having perfectly straight lines, but may have a substantially hexahedral shape.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1, 2, 3, and 4 and opposing each other in a third direction.

As margin regions in which the internal electrode 121 or 122 is not disposed on the dielectric layer 111 overlap each other, a step may be caused by thicknesses of the internal electrode 121 or 122, such that a corner, connecting a first surface and third to fifth surfaces to each other, and/or a corner, connecting a second surface and the third to fifth surfaces to each other, may shrink toward a central portion of the body 110 in the first direction, based on the first surface or the second surface. Alternatively, due to a shrinkage behavior of the body during a sintering process, a corner, connecting the first surface 1 and the third to sixth surfaces 3, 4, 5, and 6 to each other, and/or a corner, connecting the second surface 2 and the third to sixth surfaces 3, 4, 5, and 6 to each other, may shrink toward the central portion of the body 110 in the first direction, based on the first surface or the second surface. Alternatively, in order to prevent chipping defects, an additional process may be performed to round corners connecting respective surfaces of the body 110 to each other. Accordingly, a corner, connecting a first surface and third to sixth surfaces to each other, and/or a corner, connecting a second surface and the third to sixth surfaces to each other, may have a round shape.

In order to suppress a step caused by the internal electrode 121 or 122, internal electrodes may be stacked and then cut to be exposed to the fifth and sixth surfaces 5 and 6 of the body. Thereafter, one dielectric layer or two or more dielectric layers may be stacked on both side surfaces of the capacitance formation portion Ac in the third direction (width direction) to form margin portions 114 and 115. In this case, a portion, connecting a first surface and fifth and sixth surfaces to each other, and a portion, connecting a second surface and the fifth and sixth surfaces to each other, may not shrink.

A plurality of dielectric layers 111, included in the body 110, may be in a sintered state, and adjacent dielectric layers 111 may be integrated with each other such that boundaries therebetween are not readily apparent without using an SEM. The number of stacked dielectric layers is not particularly limited, and may be determined in consideration of a size of the multilayer electronic component. For example, the body may be formed by stacking 400 or more dielectric layers on each other.

The dielectric layer 111 may be formed by preparing a ceramic slurry including ceramic powder particles, an organic solvent and a binder, applying the slurry on a carrier film and drying the same to prepare a ceramic green sheet, and then sintering the ceramic green sheet. The ceramic powder particles are not particularly limited as long as sufficient capacitance is obtainable therewith, and may use, for example, barium titanate-based ($BaTiO_3$)-based powder particles. For a more specific example, the ceramic powder particles may be at least one of $BaTiO_3$ or $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), and $Ba(Ti_{1-y}Zr_y)O_3$ ($0<y<1$).

An average thickness td of the dielectric layer 111 is not particularly limited, but may be 10 μm or less, for example. In addition, the average thickness td of the dielectric layer 111 may be arbitrarily set depending on desired characteristics or usage of the multilayer electronic component.

However, when the average thickness td of the dielectric layer 111 is 0.4 μm or less, the effect according to the present disclosure may become more remarkable.

In general, as the dielectric layer 111 has a reduced thickness, stress non-uniformity between an internal electrode and a dielectric layer, disconnection between internal electrodes, and agglomeration of the internal electrodes may easily occur during a sintering process. Conversely, in the multilayer electronic component according to an example embodiment of the present disclosure, the ceramic layer CL may be disposed between the dielectric layer 111 and the internal electrode 121 or 122, thereby suppressing disconnection of the internal electrodes and agglomeration of the internal electrodes and suppressing stress non-uniformity between the internal electrodes and the dielectric layer during the sintering process. Thus, the multilayer electronic component may have improved reliability, even when the average thickness td of the dielectric layer 111 is 0.4 μm or less.

Here, the average thickness td of the dielectric layer 111 may refer to a size of the dielectric layer 111 disposed between the internal electrodes 121 and 122 in the first direction. The average thickness of the dielectric layer 111 may be measured by scanning, with an SEM, cross-sections of the body 110 in the first and second directions at a magnification of 10,000. More specifically, thicknesses of a plurality of points of one dielectric layer 111, for example, thirty points equally spaced apart from each other in the second direction, may be measured to measure an average value thereof. The thirty equally spaced points may be designated in a capacitance formation portion Ac to be described below. In addition, when such average value measurement is performed on ten dielectric layers 111, the average thickness of the dielectric layer 111 may be further generalized.

The body 110 may include a capacitance formation portion Ac disposed in the body 110, the capacitance formation portion Ac having capacitance by including the first internal electrode 121 and the second internal electrode 122 disposed to oppose each other with the dielectric layer 111 interposed therebetween, and cover portions 112 and 113 disposed on upper and lower portions of the capacitance formation portion Ac in the first direction.

In addition, the capacitance formation portion Ac may be a portion contributing to forming capacitance of a capacitor, and may be formed by repeatedly stacking the plurality of first and second internal electrodes 121 and 122 on each other with the dielectric layer 111 interposed therebetween.

The cover portions 112 and 113 may include an upper cover portion 112 disposed on the upper portion of the capacitance formation portion Ac in the first direction, and a lower cover portion 113 disposed on the lower portion of the capacitance formation portion Ac in the first direction.

The upper cover portion 112 and the lower cover portion 113 may be respectively formed by stacking one dielectric layer or two or more dielectric layers on upper and lower surfaces of the capacitance formation portion Ac in a thickness direction, and may basically serve to prevent an internal electrode from being damaged due to physical or chemical stress.

The upper cover portion 112 and the lower cover portion 113 may not include an internal electrode, and may include a material the same as that of the dielectric layer 111.

That is, the upper cover portion 112 and the lower cover portion 113 may include a ceramic material, and may include, for example, a barium titanate ($BaTiO_3$)-based ceramic material.

A thickness of the cover portion 112 or 113 is not particularly limited. However, a thickness tc of the cover portion 112 or 113 may be 15 µm or less, such that the multilayer electronic component may more easily have a smaller size and higher capacitance.

An average thickness tc of the cover portion 112 or 113 may refer to a size of the cover portion 112 or 113 in the first direction, and may have a value obtained by averaging sizes of the cover portion 112 or 113 in the first direction, measured at five equally spaced points of an upper portion or lower portion of the capacitance formation portion Ac.

In addition, the margin portions 114 and 115 may be disposed on side surfaces of the capacitance formation portion Ac, respectively.

The margin portions 114 and 115 may include a first margin portion 114 disposed on a fifth surface 5 of the body 110 and a second margin portion 115 disposed on a sixth surface 6 of the body 110. That is, the margin portions 114 and 115 may be disposed on end surfaces of the ceramic body 110 in a width direction, respectively.

As illustrated in FIG. 3, the margin portions 114 and 115 may refer to a region between both ends of the first and second internal electrodes 121 and 122 and an interface of the body 110, with respect to a cross-section of the body 110 cut in a width-thickness (W-T) direction.

The margin portions 114 and 115 may basically serve to prevent an internal electrode from being damaged due to physical or chemical stress.

The margin portions 114 and 115 may be formed by forming an internal electrode by applying a conductive paste on a ceramic green sheet, except for a portion of the ceramic green sheet on which a margin portion is to be formed.

In addition, in order to suppress a step caused by the internal electrode 121 or 122, internal electrodes may be stacked on each other and then cut to be exposed to the fifth and sixth surfaces 5 and 6 of the body. Thereafter, one dielectric layer or two or more dielectric layers may be stacked on both side surfaces of the capacitance formation portion Ac in the third direction (width direction) to form a margin portion 114 or 115.

A width of the margin portion 114 or 115 is not particularly limited. However, an average width of the margin portion 114 or 115 may be 15 µm or less, such that the multilayer electronic component may more easily have a smaller size and higher capacitance.

The average width of the margin portion 114 or 115 may be an average size of a region in which an internal electrode is spaced apart from the fifth surface in the third direction or an average size of a region in which an internal electrode is spaced apart from the sixth surface in the third direction, and may have an average value of sizes of the margin portion 114 or 115 in the third direction, measured at five equally spaced points of a side surface of the capacitance formation portion Ac.

Accordingly, in an example embodiment, average sizes MW1 and MW2 of regions in which the internal electrode 121 or 122 is spaced apart from the fifth and sixth surfaces in the third direction may be 15 µm or less, respectively.

The internal electrode 121 or 122 may include the first internal electrode 121 and the second internal electrode 122. The first and second internal electrodes 121 and 122 may be alternately disposed to oppose each other with the dielectric layer 111, included in the body 110, interposed therebetween, and may respectively be exposed to the third and fourth surfaces 3 and 4 of the body 110.

The first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body to be connected to the first internal electrode 121, and the second external electrode 132 may be disposed on the fourth surface 4 of the body to be connected to the second internal electrode 122.

That is, the first internal electrode 121 may not be connected to the second external electrode 132 and connected to the first external electrode 131, and the second internal electrode 122 may not be connected to the first external electrode 131 and connected to the second external electrode 132. Accordingly, the first internal electrode 121 may be spaced apart from the fourth surface 4 by a predetermined distance, and the second internal electrode 122 may be spaced apart from the third surface 3 by a predetermined distance. In addition, the first and second internal electrodes 121 and 122 may be disposed to be spaced apart from the fifth and sixth surface of the body 110.

A conductive metal, included in the internal electrode 121 or 122, may be at least one of Ni, Cu, Pd, Ag, Au, Pt, In, Sn, Al, Ti, and alloys thereof, but the present disclosure is not limited thereto.

The internal electrode 121 or 122 may be formed by forming a ceramic film on a ceramic green sheet, applying a conductive paste for internal electrodes including a conductive metal to a predetermined thickness on the ceramic film, and sintering the conductive paste.

When the internal electrode 121 or 122 is formed by printing a conductive paste for internal electrodes on a ceramic green sheet without forming a ceramic film, necking may occur between conductive metals during a sintering process, such that disconnection between internal electrodes and/or agglomeration of the internal electrodes easily occur. Such disconnection between the internal electrodes and the like may cause a reduction in capacitance and a reduction in insulation resistance characteristics of the multilayer electronic component. According to the present disclosure, an internal electrode may be formed to have a reduced and uniform thickness even when the internal electrode is formed by printing a conductive paste for internal electrodes, due to an effect of suppressing stress non-uniformity and a constrained sintering effect of the ceramic layer CL.

As a method of applying a conductive paste for internal electrodes, a screen-printing method or a gravure-printing method may be used, but the present disclosure is not limited thereto.

The internal electrode 121 or 122 may be formed by forming a ceramic film on a ceramic green sheet, and then sputtering and/or depositing a conductive metal on the ceramic film using a sputtering method, a vacuum deposition method, and/or a chemical vapor deposition (CVD) method. More preferably, the internal electrode 121 or 122 may be a sputtering layer formed by the sputtering method.

When the internal electrode 121 or 122 is a sputtering layer, the internal electrode 121 or 122 may have high density, and stress non-uniformity, caused by sintering of metal particles of an internal electrode during temperature rise, may become relatively low. However, the internal electrode may include a film having high density, and a dielectric layer may include a ceramic green sheet having low density. The internal electrode and the dielectric layer may include different materials, and thus stress may occur due to a density difference and material difference between the internal electrode and the dielectric layer. According to the present disclosure, the ceramic layer CL may be disposed between the dielectric layer 111 and the internal electrode 121 or 122, thereby minimizing stress caused a density difference and material difference between the dielectric layer 111 and the internal electrode 121 or 122.

An average thickness te of the internal electrode is not particularly limited. In this case, a thickness of the internal electrode 121 or 122 may refer to a size of the internal electrode 121 or 122 in the first direction.

However, in the multilayer electronic component according to an example embodiment of the present disclosure, the ceramic layer CL may be disposed between the dielectric layer 111 and the internal electrode 121 or 122, thereby suppressing disconnection between internal electrodes and agglomeration of the internal electrodes, and suppressing stress non-uniformity between an internal electrode and a dielectric layer during a sintering process. Thus, even when an average thickness of the internal electrode 121 or 122 is 300 nm or less, reliability of the multilayer electronic component may be secured. A lower limit of the average thickness of the internal electrode 121 or 122 is not particularly limited, but may be, for example, 50 nm or more.

Here, the average thickness te of the internal electrode may be measured by scanning, with an SEM, cross-sections of the body 110 in the first and second directions at a magnification of 10,000. More specifically, thicknesses of a plurality of points of the internal electrode 121 or 122, for example, thirty points equally spaced apart from each other in a second direction, may be measured to measure an average value thereof. The thirty equally spaced points may be designated in the capacitance formation portion Ac. In addition, when such average value measurement is performed on ten internal electrodes 121 or ten internal electrodes 122, the average thickness of the internal electrode 121 or 122 may be further generalized.

In an example embodiment, when a standard deviation of a thickness of the internal electrode 121 or 122 is σte, σte/te may be 0.05 or less. When σte/te is 0.05 or less, uniformity of the thickness of the internal electrode 121 or 122 may be secured, thereby preventing stress from being non-uniformly applied to the internal electrode 121 or 122.

As a result, agglomeration of internal electrodes and disconnection between the internal electrodes may be prevented.

The standard deviation σte of the thickness of the internal electrode may be obtained by subtracting the average thickness te of the internal electrode from the thicknesses of the thirty points equally spaced apart from each other in the second direction, performing a squaring operation thereon, calculating an average value thereof to obtain a variance value thereof, and taking a square root of the variance value.

When the internal electrode 121 or 122 is a sputtering layer, the average thickness te of the internal electrode 121 or 122 and the standard deviation σte of the thickness of the internal electrode may be easily reduced, and the internal electrode 121 or 122 having an average thickness of 300 nm or less may be easily formed.

The external electrodes 131 and 132 may be disposed on the third and fourth surfaces 3 and 4 of the body 110, respectively.

The external electrodes 131 and 132 may be disposed on the third and fourth surfaces 3 and 4 of the body 110, respectively, and may include first and second external electrodes 131 and 132 respectively connected to the first and second internal electrodes 121 and 122.

Referring to FIG. 1, the external electrodes 131 and 132 may be disposed to cover both end surfaces of the side margin portions 114 and 115 in the second direction.

In the present example embodiment, a structure in which the multilayer electronic component 100 has two external electrodes 131 and 132 is described, but the number and shape of the external electrodes 131 and 132 may be changed depending on a shape of the internal electrode 121 or 122 or other purposes.

The external electrode 131 or 132 may be formed of any material having electrical conductivity, such as metal or the like, and a specific material may be determined in consideration of electrical characteristics, structural stability, and the like. Furthermore, the external electrode 131 or 132 may have a multilayer structure.

For example, the external electrode 131 or 132 may include an electrode layer 131a or 132a disposed on the body 110 and a plating layer 131b or 132b formed on the electrode layer 131a or 132a.

For a more specific example of the electrode layer 131a or 132a, the electrode layer 131a or 132a may be a sintered electrode including a conductive metal and glass, or a resin-based electrode including a conductive metal and resin.

In addition, the electrode layer 131a or 132a may have a form in which a sintered electrode and a resin-based electrode are sequentially formed on a body. In addition, the electrode layer 131a or 132a may be formed by transferring a sheet including a conductive metal onto the body or by transferring a sheet including a conductive metal onto the sintered electrode.

A material having excellent electrical conductivity may be used as the conductive metal included in the electrode layer 131a or 132a, but the material is not particularly limited. For example, the conductive metal may be at least one of nickel (Ni), copper (Cu), and an alloy thereof.

The plating layer 131b or 132b may serve to improve mounting characteristics. A type of the plating layer 131b or 132b is not particularly limited, and may be a plating layer including at least one of Ni, Sn, Pd, and alloys thereof, and may be formed as a plurality of layers.

For a more specific example of the plating layer 131b or 132b, the plating layer 131b or 132b may be a Ni plating layer or a Sn plating layer, may have a form in which a Ni plating layer and a Sn plating layer are sequentially formed on the electrode layer 131a or 132a, and may have a form in which a Sn plating layer, a Ni plating layer, and a Sn plating layer are sequentially formed. In addition, the plating layer 131b or 132b may include a plurality of Ni plating layers and/or a plurality of Sn plating layers.

A size of the multilayer electronic component 100 is not particularly limited.

However, according to an example embodiment of the present disclosure, a thickness of an internal electrode and a dielectric layer may be reduced due to an effect of suppressing stress non-uniformity and/or a constrained sintering effect of the ceramic layer CL. Thus, in the multilayer electronic component 100, having a size of 0603 (length× width, 0.6 mm×0.3 mm) or less, an effect of improving reliability and capacitance per unit volume according to the present disclosure may become more remarkable. In addition, the structure according to the present disclosure may also be applied to the multilayer electronic component 100 having a size of 0201 (length×width, 0.2 mm×0.1 mm) or less.

Considering a manufacturing error, an external electrode size, and the like, when the multilayer electronic component 100 has a length of 0.66 mm or less and a width of 0.33 mm or less, an effect of improving reliability and capacitance per unit volume according to the present disclosure may become more remarkable. Here, a length of the multilayer electronic component 100 may refer to a maximum size of the multilayer electronic component 100 in the second direction, and a width of the multilayer electronic component 100 may refer to a maximum size of the multilayer electronic component 100 in the third direction. A maximum size of the multilayer electronic component in the second direction may be 0.22 mm or less (excluding 0). A maximum size of the multilayer electronic component in the third direction may be 0.11 mm or less (excluding 0). The maximum sizes may be measured by optical microscopy. Other methods and/or tools appreciated by one of ordinary skill in the art, even if not described in the present disclosure, may also be used.

The multilayer electronic component 100 according to an example embodiment of the present disclosure may include a body 110 including a dielectric layer 111 and internal electrodes 121 and 122 alternately disposed with the dielectric layer, and external electrodes 131 and 132 disposed on the body. A ceramic layer CL may be disposed between the dielectric layer 111 and the internal electrode 121 or 122, and the ceramic layer may be formed as a sputtering layer, a layer formed using a vacuum deposition method, or a layer using an ALD method.

Method of Manufacturing Multilayer Electronic Component

Figure 9:
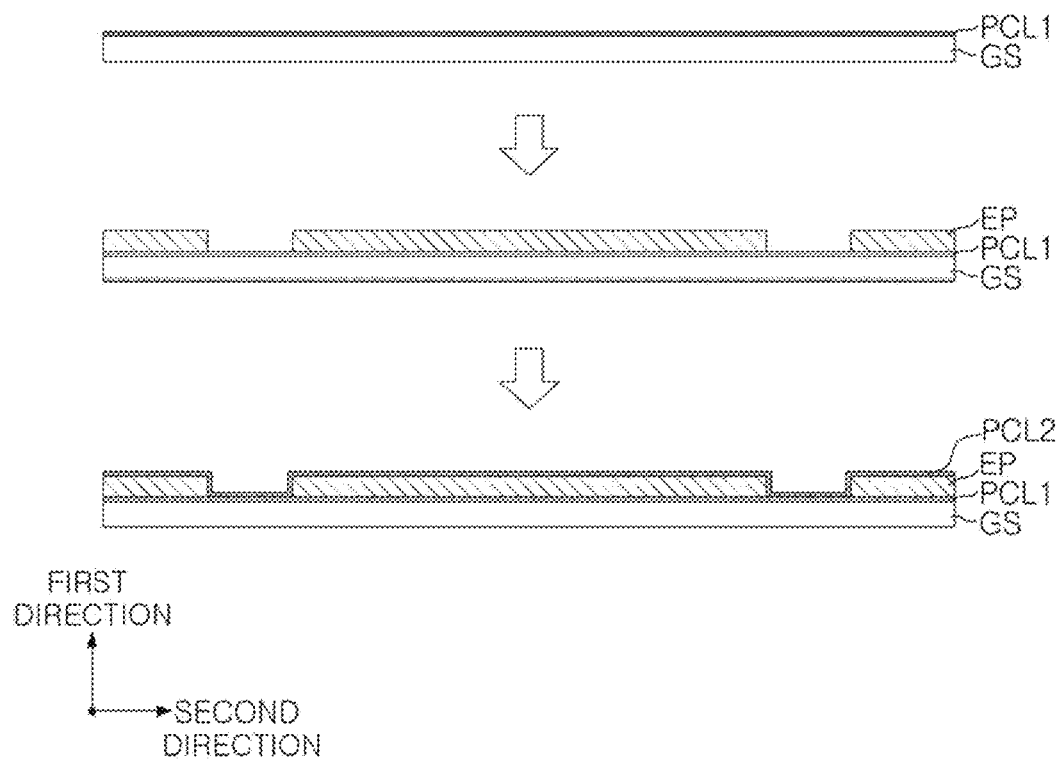
FIG. 9 is a view illustrating a process of forming a ceramic film and an internal electrode pattern on a ceramic green sheet in a method of manufacturing a multilayer electronic component according to an example embodiment of the present disclosure.

FIG. 9 is a view illustrating a process of forming a ceramic film and an internal electrode pattern on a ceramic green sheet in a method of manufacturing a multilayer electronic component according to an example embodiment of the present disclosure.

Figure 10:
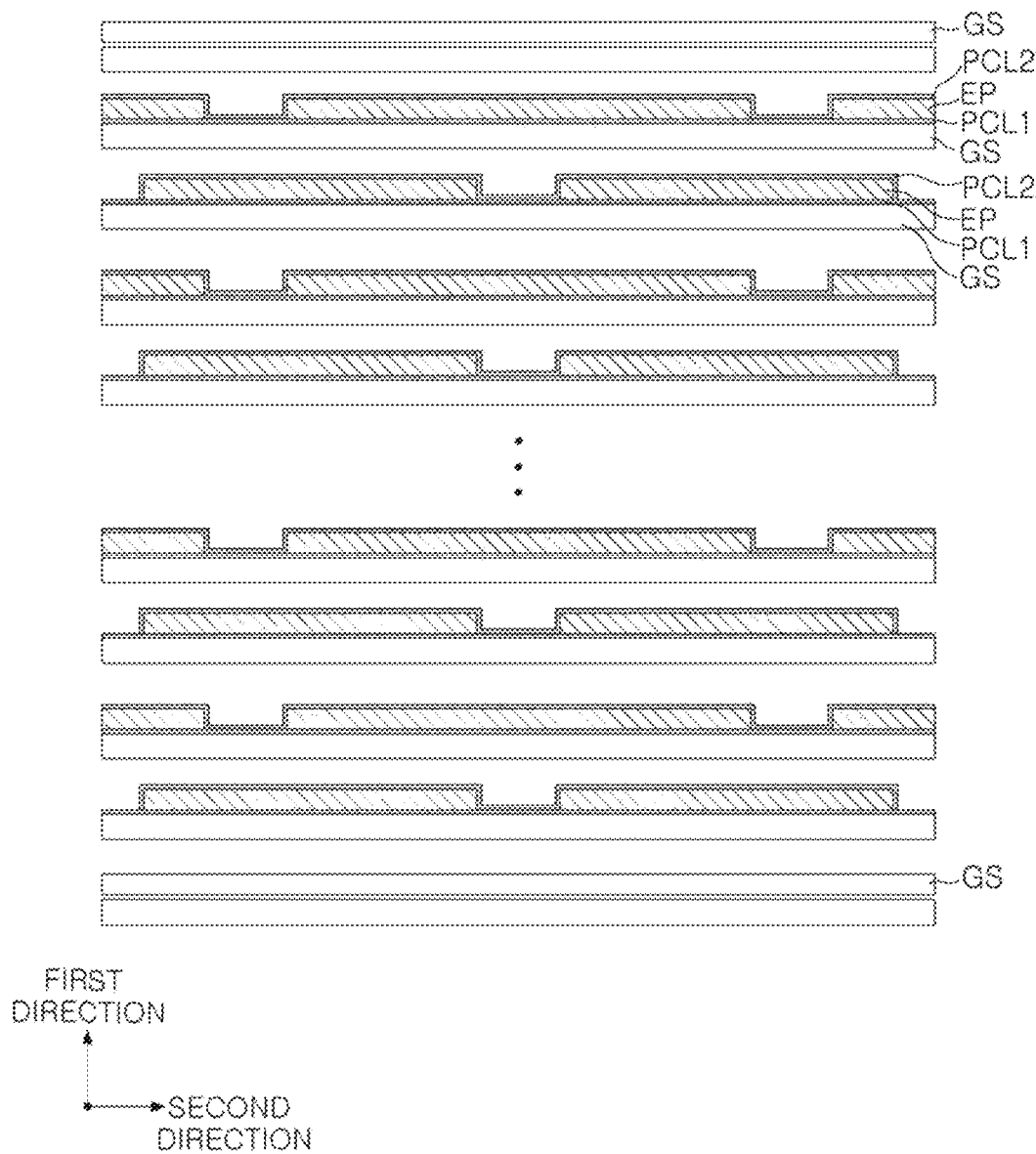
FIG. 10 is a view illustrating a process of forming a stack in a method of manufacturing a multilayer electronic component according to an example embodiment of the present disclosure.

FIG. 10 is a view illustrating a process of forming a stack in a method of manufacturing a multilayer electronic component according to an example embodiment of the present disclosure.

A method of manufacturing a multilayer electronic component according to an example embodiment of the present disclosure may include forming a first ceramic film PCL1 by depositing a ceramic material on a ceramic green sheet GS, forming an internal electrode pattern EP on the first ceramic film, and forming a second ceramic film PCL2 by depositing a ceramic material on the internal electrode pattern, obtaining a stack by stacking the ceramic green sheet, obtaining a body by sintering the stack, and forming an external electrode on the body.

Hereinafter, a method of manufacturing a multilayer electronic component according to an example embodiment of the present disclosure will be described with reference to FIGS. 9 and 10. However, the above-described multilayer electronic component according to an example embodiment of the present disclosure is not limited by a manufacturing method described below, and a description overlapping the above description may be omitted to avoid a repeated description.

Referring to FIG. 9, a first ceramic film PCL1 may be formed by depositing a ceramic material on a ceramic green sheet GS. A method of depositing the ceramic material is not particularly limited, and may be formed using a sputtering method, a vacuum deposition method, or an ALD method. The first ceramic film PCL1 may form a first ceramic layer CL1 after a sintering process.

The ceramic green sheet GS is not particularly limited, and the ceramic green sheet may be formed using ceramic powder particles. For example, the ceramic green sheet may be formed using a slurry including ceramic powders, an organic solvent, and a binder. Specifically, the ceramic green sheet GS may be formed by adding an additive to ceramic powder particles, mixing the ceramic powder particles, to which the additive is added, with a dispersant using ethanol and toluene as solvents, and then mixing the ceramic powder particles, mixed with the dispersant, with a binder. The ceramic powder particles may be $BaTiO_3$-based ceramic powder particles, for example, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), or $Ba(Ti_{1-y}Zr_y)O_3$ ($0<y<1$) obtained by partially dissolving Ca or Zr in $BaTiO_3$.

In this case, a ceramic material, included in the first and second ceramic films PCL1 and PCL2, may be the same as that of the ceramic powder particles included in the ceramic green sheet GS.

Thereafter, an internal electrode pattern EP may be formed on the first ceramic film PCL1.

A method of forming the internal electrode pattern EP is not particularly limited. As described above, the internal electrode pattern EP may be formed by applying a conductive paste for internal electrodes including a conductive metal. A screen-printing method or a gravure-printing method may be used as a method of applying the conductive paste for internal electrodes, and the present disclosure is not limited thereto.

In addition, the internal electrode pattern EP may be formed by sputtering and/or depositing a conductive metal on the first ceramic film PCL1 using a sputtering method, a vacuum deposition method, and/or a CVD method. In this case, a mask may be disposed in a region in which the internal electrode pattern EP is not to be formed, thereby preventing the internal electrode pattern EP from being deposited.

The internal electrode pattern EP may form the internal electrode 121 or 122 after a sintering process.

Thereafter, a ceramic material may be deposited on the internal electrode pattern EP to form a second ceramic film PCL2. The second ceramic film PCL2 may form the second ceramic layer CL2 after a sintering process.

Referring to FIG. 10, a stack may be formed by stacking a ceramic green sheet on which the first ceramic layer PCL1, the internal electrode pattern EP, and the second ceramic layer PCL2 are formed.

A cover portion may be formed by stacking, on upper and lower portions of the multilayer body in a first direction, a ceramic green sheet on which the first ceramic film PCL1, the internal electrode pattern EP, and the second ceramic film PCL2 are not formed.

Thereafter, a body may be obtained by sintering the stack. In this case, the stack may be cut in the unit of chips before sintering, and then sintering may be performed.

In addition, the body may include a dielectric layer and an internal electrode alternately disposed with the dielectric layer. A ceramic layer may be disposed between the dielectric layer and the internal electrode. When an area ratio occupied by pores with respect to the ceramic layer is Sp1 and an area ratio occupied by pores with respect to the dielectric layer is Sp2, Sp1 may be less than 5%, and Sp1<Sp2 may be satisfied.

Subsequently, a multilayer electronic component 100 may be manufactured by forming external electrodes 131 and 132 on the body 110.

A method of forming the external electrode 131 or 132 is not particularly limited, and a method of dipping into a paste including a conductive metal and glass may be used, or a method of transferring a sheet including a conductive metal may be used. In addition, an external electrode may be formed using a paste including a conductive metal and resin, an ALD method, a molecular layer deposition (MLD) method, a CVD method, a sputtering method, or the like.

In addition, a plating process may be further performed, such that the external electrode may include a plating layer 131b or 132b.

While example embodiments have been illustrated and described above, it will be apparent to those skilled in the art that modifications and variations could be made without departing from the scope of the present disclosure as defined by the appended claims.

In addition, the term "an example embodiment" used herein does not refer to the same example embodiment, and is provided to emphasize a particular feature or characteristic different from that of another example embodiment. However, example embodiments provided herein are considered to be able to be implemented by being combined in whole or in part one with one another. For example, one element described in a particular example embodiment, even if it is not described in another example embodiment, may be understood as a description related to another example embodiment, unless an opposite or contradictory description is provided therein.

The terms used herein is for the purpose of describing particular example embodiments only and is not to be limiting of the example embodiments. As used herein, the singular forms "a," "an," and "the" are intended to include the plural forms as well, unless the context clearly indicates otherwise.

What is claimed is:

1. A multilayer electronic component comprising:
   a body including:
      a dielectric layer,
      an internal electrode alternately disposed with the dielectric layer, and
      a ceramic layer disposed between the dielectric layer and the internal electrode; and
      an external electrode disposed on the body,
   wherein
   an area ratio occupied by pores with respect to the ceramic layer is Sp1, an area ratio occupied by pores with respect to the dielectric layer is Sp2,
   Sp1 is less than 5%, and Sp1<Sp2 is satisfied.

2. The multilayer electronic component of claim 1, wherein Sp2 is 5% or more and 40% or less.

3. The multilayer electronic component of claim 1, wherein the ceramic layer includes at least one of Ba, Ti, Si, Zr, Hf, and Sr.

4. The multilayer electronic component of claim 1, wherein
   the dielectric layer includes, as a main ingredient, at least one of $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), and $Ba(Ti_{1-y}Zr_y)O_3$ ($0<y<1$), and
   the ceramic layer includes a main ingredient that is the same as the main ingredient of the dielectric layer.

5. The multilayer electronic component of claim 1, wherein an average thickness of the ceramic layer is 5 nm or more and 50 nm or less.

6. The multilayer electronic component of claim 1, wherein the ceramic layer is formed by a sputtering method, a vacuum deposition method, or an atomic layer deposition (ALD) method.

7. The multilayer electronic component of claim 1, wherein
   an area ratio occupied by pores with respect to the internal electrode is Sp3,
   Sp3 is less than 5%, and Sp3<Sp2 is satisfied.

8. The multilayer electronic component of claim 7, wherein an average thickness of the internal electrode is 5 nm or more and 300 nm or less.

9. The multilayer electronic component of claim 1, comprising a plurality of the ceramic layer,
   wherein
   the dielectric layer and the internal electrode are alternately disposed in a first direction,
   the body has first and second surfaces opposing each other in the first direction, third and fourth surfaces opposing each other in a second direction and connected to the first and second surfaces, and fifth and sixth surfaces opposing each other in a third direction and connected to the first to fourth surfaces, and
   at least one of the ceramic layers is connected to the third and fourth surfaces.

10. The multilayer electronic component of claim 9, wherein at least one of the ceramic layers is connected to the third, fourth, fifth, and sixth surfaces.

11. The multilayer electronic component of claim 1, comprising a plurality of the ceramic layer,
    wherein
    the dielectric layer and the internal electrode are alternately disposed in a first direction,
    the body has first and second surfaces opposing each other in the first direction, third and fourth surfaces opposing each other in a second direction and connected to the first and second surfaces, and fifth and sixth surfaces opposing each other in a third direction and connected to the first to fourth surfaces, and
    a maximum size of the multilayer electronic component in the second direction is 0.22 mm or less, and a maximum size of the multilayer electronic component in the third direction is 0.11 mm or less.

12. A method of manufacturing a multilayer electronic component, the method comprising:
    forming a first ceramic film by depositing a ceramic material on a ceramic green sheet in a stacking direction;
    forming an internal electrode pattern directly on the first ceramic film in the stacking direction;
    forming a second ceramic film by depositing the ceramic material on the internal electrode pattern;
    stacking a plurality of the ceramic green sheet to obtain a stack;
    sintering the stack to obtain a body including a dielectric layer, an internal electrode alternately disposed with the dielectric layer, and a ceramic layer disposed between the dielectric layer and the internal electrode; and
    forming an external electrode on the body,
    wherein an area ratio occupied by pores with respect to the ceramic layer is different than an area ratio occupied by pores with respect to the dielectric layer.

13. The method of claim 12, wherein
    an area ratio occupied by pores with respect to the ceramic layer is Sp1, an area ratio occupied by pores with respect to the dielectric layer is Sp2,
    Sp1 is less than 5%, and Sp1<Sp2 is satisfied.

14. The method of claim 12, wherein the ceramic green sheet is formed from a slurry including ceramic powder particles, an organic solvent, and a binder.

15. The method of claim 14, wherein
    the dielectric layer includes, as a main ingredient, at least one of $BaTiO_3$, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$), and $Ba(Ti_{1-y}Zr_y)O_3$ ($0<y<1$), and the ceramic material includes a material that is the same as that of the ceramic powder particles.

16. The method of claim 12, wherein the forming of the internal electrode pattern includes depositing a conductive material on the first ceramic film.

17. The method of claim 12, wherein the depositing of the ceramic material on the ceramic green sheet includes performing a sputtering method, a vacuum deposition method, or an atomic layer deposition (ALD) method.

18. The method of claim 12, wherein the depositing of the ceramic material on the internal electrode pattern includes performing a sputtering method, a vacuum deposition method, or an atomic layer deposition (ALD) method.

19. The method of claim 16, wherein the depositing of the conductive material on the first ceramic film includes performing a sputtering method, a vacuum deposition method, an atomic layer deposition (ALD) method, a chemical deposition method, a screen-printing method or a gravure-printing method.

20. The method of claim 12, wherein the ceramic layer includes at least one of Ba, Ti, Si, Zr, Hf, and Sr.

* * * * *